United States Patent [19]

Fukumoto

[11] Patent Number: 4,752,276
[45] Date of Patent: Jun. 21, 1988

[54] TURNTABLE DRIVING MECHANISM

[75] Inventor: Shigeaki Fukumoto, Nara, Japan

[73] Assignee: Sharp Kabushiki Kaisha, Osaka, Japan

[21] Appl. No.: 10,401

[22] Filed: Feb. 3, 1987

[30] Foreign Application Priority Data

Feb. 3, 1986 [JP] Japan .............................. 61-14685[U]

[51] Int. Cl.$^4$ ................................................ F16D 3/10
[52] U.S. Cl. .................................. 464/160; 219/10.55 F
[58] Field of Search ................. 219/10.55 E, 10.55 F;
464/160; 310/47, 48, 268

[56] References Cited

U.S. PATENT DOCUMENTS

| 4,520,250 | 5/1985 | Ishihara | 219/10.55 F |
| 4,595,827 | 6/1986 | Harai | 219/10.55 F |
| 4,661,085 | 4/1987 | Carli | 464/160 |

Primary Examiner—A. D. Pellinen
Assistant Examiner—Leon K. Fuller
Attorney, Agent, or Firm—Flehr, Hohbach, Test, Albritton & Herbert

[57] ABSTRACT

A mechanism for driving a turntable in a heating apparatus uses a motor with the characteristic of reversing its direction of rotation when a load greater than its output torque is applied to its shaft. The shaft is engaged with a coupling member attached to the turntable but a gap is provided between the shaft and the coupling member such that they can rotate with respect to each other by a predetermined maximum idling angle before a power-communicating relationship is established between them. This maximum idling angle is set greater than the angle of rotation of the shaft necessary for the output torque of the motor to reach the starting torque of the coupling member.

6 Claims, 2 Drawing Sheets

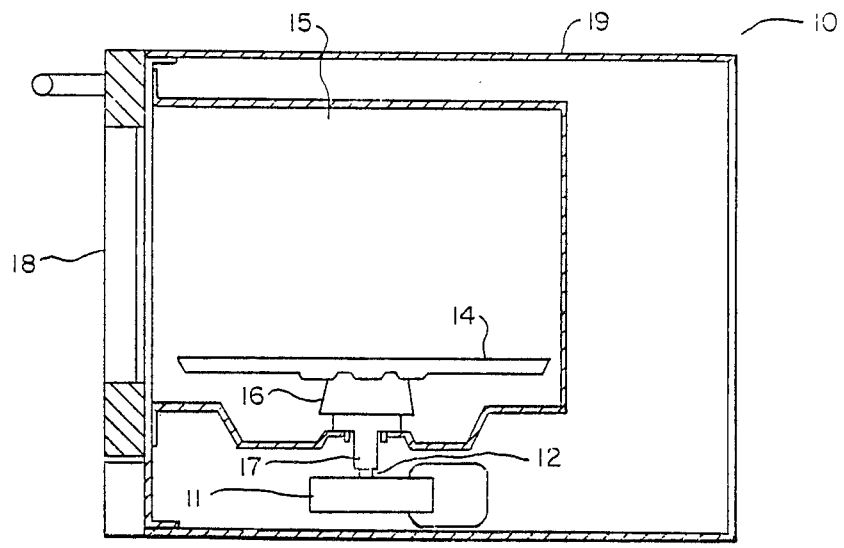
FIG.—1
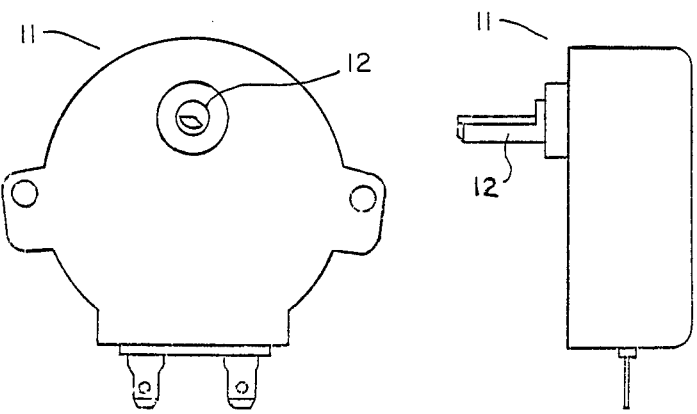
FIG.—2A  FIG.—2B
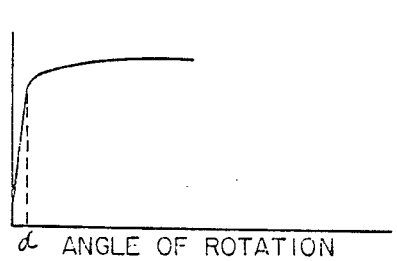
FIG.—3
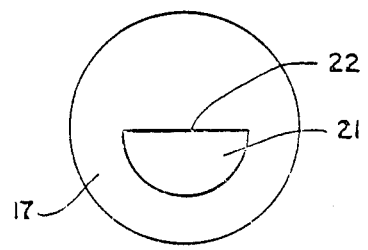
FIG.—4

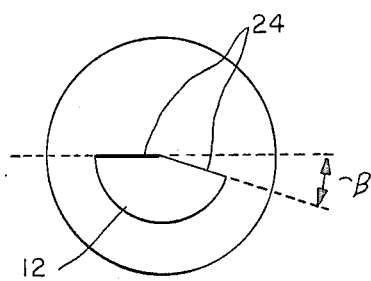
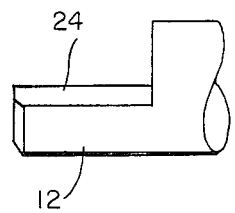
FIG.—5A            FIG.—5B
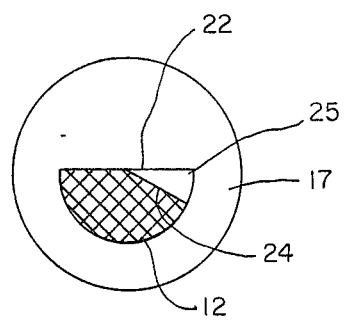
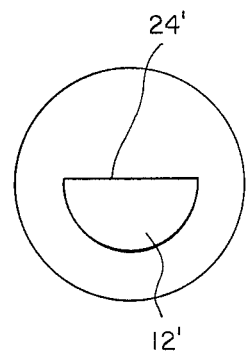
FIG.—6             FIG.—7
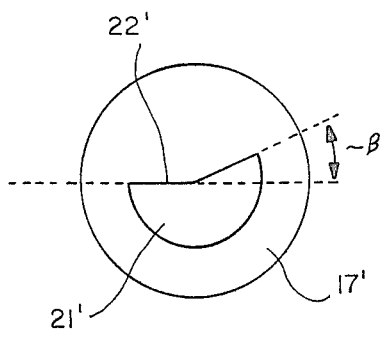
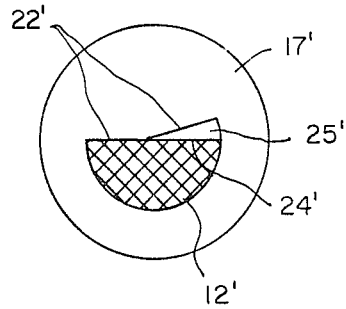
FIG.—8             FIG.—9

TURNTABLE DRIVING MECHANISM

BACKGROUND OF THE INVENTION

This invention relates to a mechanism for driving a turntable in a heating apparatus such as an electric oven or a microwave oven and more particularly to a driving mechanism with which an inexpensive motor with a small starting torque can be used for a turntable in such a heating apparatus.

It has been known to provide a heating apparatus such as an electric oven or a microwave oven with a turntable. Articles to be heated are placed on such a turntable and rotated for preventing uneven heating. In general, however, a turntable with many articles placed thereon requires a motor with a large output torque when starting its rotary motion. Accordingly, a motor with large starting torque is used for this purpose but such a motor is expensive and the overall production cost of a heating device is thereby adversely affected.

SUMMARY OF THE INVENTION

It is therefore an object of the present invention to provide an inexpensive turntable driving mechanism requiring as its pore source only an inexpensive motor with relatively small starting torque.

The above and other objects of the present invention are achieved by using as power source a synchronous motor of the type which reverses the direction of its rotation if a load greater than its output torque is applied to its shaft. Between this shaft and a coupling member attached to the turntable, there is provided a gap such that they can rotate with respect to each other by a predetermined maximum idling angle greater than the angle by which the motor must rotate before its output torque reaches the starting torque of the coupling member before a power-communicating relationship is established between them.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a side sectional view of a microwave oven incorporating a turntable driving mechanism of the present invention, FIGS. 2A and 2B are respectively a front view and a side view of a synchronous motor which may be used in connection with a turntable driving mechanism of the present invention, FIG. 3 is a graph schematically showing the relationship between the output torque and the angle of rotation of the motor shown in FIGS. 1 and 2, FIG. 4 is a front view of a coupling shaft, FIGS. 5A and 5B are respectively enlarged front and side views of a motor shaft according to one embodiment of the present invention to be used in combination with the coupling shaft shown in FIG. 4, FIG. 6 is a sectional view of the coupling shaft of FIG. 4 and the shaft of FIG. 5 when they are engaged to each other, FIG. 7 is a front view of another shaft, FIG. 8 is a front view of coupling shaft according to another embodiment of the present invention to be used in combination with the shaft shown in FIG. 7, and FIG. 9 is a sectional view of the shaft of FIG. 7 and the coupling shaft of FIG. 8 when they are engaged to each other.

DETAILED DESCRIPTION OF THE INVENTION

FIG. 1 shows a microwave oven 10 incorporating a motor 11 with an output shaft 12 and a driving mechanism of the present invention for operating a turntable 14 inside a heating chamber 15. The motive force of the motor 11 is communicated to the turntable 14 through a coupling member 16 secured to the turntable 14. The coupling member 16 includes a coupling shaft 17 for coupling to the output shaft 12 of the motor 11 to communicate its rotary motion to the turntable 14. Numerals 18 and 19 respectively indicate a door to the heating chamber 15 and a housing of the microwave oven. The turntable motor 11 is inductor-type synchronous motor characterized as reversing the direction of rotation of its output shaft 12 if a load greater than its output torque is applied thereto. In other words, the shaft 12 rotates clockwise or counterclockwise, depending on how a load is applied thereto. A motor of this type (for example, Model RMOTDA009WREO manufactured by Mitsubishi Kinzoku Kabushiki Kaisha of Tokyo, Japan) is frequently used in an automatic control device and is utilized for the purpose of the present invention because the turntable 14 is provided for evenly heating the articles placed thereon and hence, the direction of its rotation is of no importance. FIG. 3 is a schematic graph of the relationship between the output torque and angle of rotation of the motor 11, showing that the output torque increases rapidly when the motor starts rotating, reaching a steady state immediately thereafter. Angle $\alpha$ is defined as the angle of rotation of the shaft 12 corresponding to the required starting torque. According to the present invention, the motor 11 is so selected that its output torque in the final steady state is only a little greater than the estimated starting torque. Angle $\alpha$ is usually small, much less than 90°.

FIG. 4 is a front view of the coupling shaft 17 and FIGS. 5A and 5B are enlarged front and side views of the output shaft 12 of the motor 11 according to one embodiment of this invention. According to this embodiment of the present invention, the coupling shaft 17 is provided with a shaft-accepting hole 21 which is D-shaped, or semi-circular in cross-section with a flat inner surface 22 extending along its axial direction. The output shaft 12 of the motor as shown most clearly in FIG. 5A, has a pie-shaped cross-section, or its cross-sectional shape may be described as a part of a circle limited by two radii thereof, making therebetween an angle somewhat smaller than 180°. As shown in FIG. 6, which is a cross-sectional view of the coupling shaft 17 and the shaft 12 when they are engaged, therefore, there is formed a wedge-shaped gap 25 left in between. The angle of this wedge is denoted as $\beta$.

When the motor 11 is initially switched on and the shaft 12 begins to rotate, therefore, the shaft 12 rotates by a certain angle (depending on the relative angular position of the shaft 2 with respect to the hole 21 in the coupling shaft 17) with no load thereon before one of its power-communicating plane surfaces 24 comes into contact with the flat inner surface 22 of the coupling shaft 17. The output torque of the shaft 12 increases rapidly as shown in FIG. 3 in the meantime. If the output torque of the motor 11 is less than the required starting torque when the power-communicating surface 24 hits the inner surface 22 of the coupling shaft 17, however, the motor 11 changes its direction of rotation and rotates by β in the reverse direction. According to the present invention, the angle β of the gap 25 is made greater than the aforementioned angle α. Thus, the turntable 14 begins to move when the other part of the power-communicating plane surfaces 24 strikes the inner surface 22 of the coupling shaft 17. In summary, even an inexpensive motor with a small starting torque can be used to operate a turntable if the output torque of the motor at the time of its steady state rotation is somewhat greater than the required starting torque.

The foregoing description of a preferred embodiment of the invention has been presented for purposes of illustration and description. It is not intended to be exhaustive or to limit the invention to the precise form disclosed, and many modifications and variations are possible in light of the above teaching. For example, the motor 11 may be provided with a shaft 12' with a D-shaped cross-section having one single flat power-communicating surface 24' as shown in FIG. 7. FIG. 8 shows a coupling shaft 17' having a hole 21' with a D-shaped cross-section and an additional wedge-shaped piece with wedge angle β removed. The shaft 12' and the coupling shaft 17' thus designed may be engaged together as shown in FIG. 9 which also shows a wedge-shaped gap 25' between the shaft 12' and the coupling shaft 17'. The shaft 12' with such a D-shaped cross-section is more easily cut and hence its fabrication cost is much lower than that of the shaft shown in FIGS. 5A and 5B. Since coupling shafts with holes are formed by molding and their shapes do not affect the fabrication cost, the driving mechanism according to the latter embodiment is less costly to manufacture.

Communication of power from the motor to the turntable need not be exactly as shown in FIG. 1. The coupling shaft 17 may be directly connected to the turntable 14 and a gear system may be provided to transmit the rotary motion of the motor shaft to the shaft of the turntable. Such modifications and variations that may be apparent to a person skilled in the art are intended to be included within the scope of this invention.

What is claimed is:

1. In a turntable driving mechanism comprising
   a motor having a drive shaft rotatably engaging in direct motion-communicating relationship with a coupling member affixed to a turntable shaft, said motor reversing the direction of rotation of said drive shaft if a load greater than the output torque thereof is applied to said drive shaft,
   the improvement wherein said coupling member and said drive shaft engaging in said motion-communicating relationship having therebetween a gap which allows said coupling member and said drive shaft to rotate with respect to each other by up to a predetermined maximum angle, said maximum angle being larger than the angle of rotation of said drive shaft for the output torque of said motor to reach the starting torque of said coupling member.

2. The turntable driving mechanism of claim 1 wherein said shaft has a semi-circular cross-sectional shape, and said coupling member has a hole with cross-sectional shape of a part of a circle limited by two radii thereof making therebetween an angle greater then 180° by said predetermined maximum angle.

3. The turntable driving mechanism of claim 1 wherein said shaft has a cross-sectional shape of a part of a circle limited by two radii thereof making therebetween an angle greater than 180° by said predetermined angle and said coupling member has a hole with a semi-circular cross-sectional shape.

4. The turntable driving mechanism of claim 1 wherein said coupling member is secured to a turntable.

5. The turntable driving mechanism of claim 1 wherein said motor is an inductor-type synchronous motor.

6. The turntable driving mechanism of claim 1 wherein said predetermined maximum angle is acute.

* * * * *

UNITED STATES PATENT AND TRADEMARK OFFICE
CERTIFICATE OF CORRECTION

PATENT NO. : 4,752,276

DATED : June 21, 1988

INVENTOR(S) : Shigeaki Fukumoto

It is certified that error appears in the above-identified patent and that said Letters Patent is hereby corrected as shown below:

Column 1, about line 25, change "pore" to --power--.

Column 1, about line 36, change "is" to --its--.

Column 2, line 60, change "shaft 2" to --shaft 12--.

Column 4, line 35, before "motor" insert --turntable--.

Signed and Sealed this

Sixth Day of December, 1988

Attest:

DONALD J. QUIGG

Attesting Officer

Commissioner of Patents and Trademarks